Dec. 2, 1958   F. COREY ET AL   2,862,230
POULTRY PROCESSING EQUIPMENT
Filed July 30, 1956   5 Sheets-Sheet 1

INVENTORS.
FLOURNOY COREY
ROBERT D. PITTS
BY Flournoy Corey
ATTORNEY.

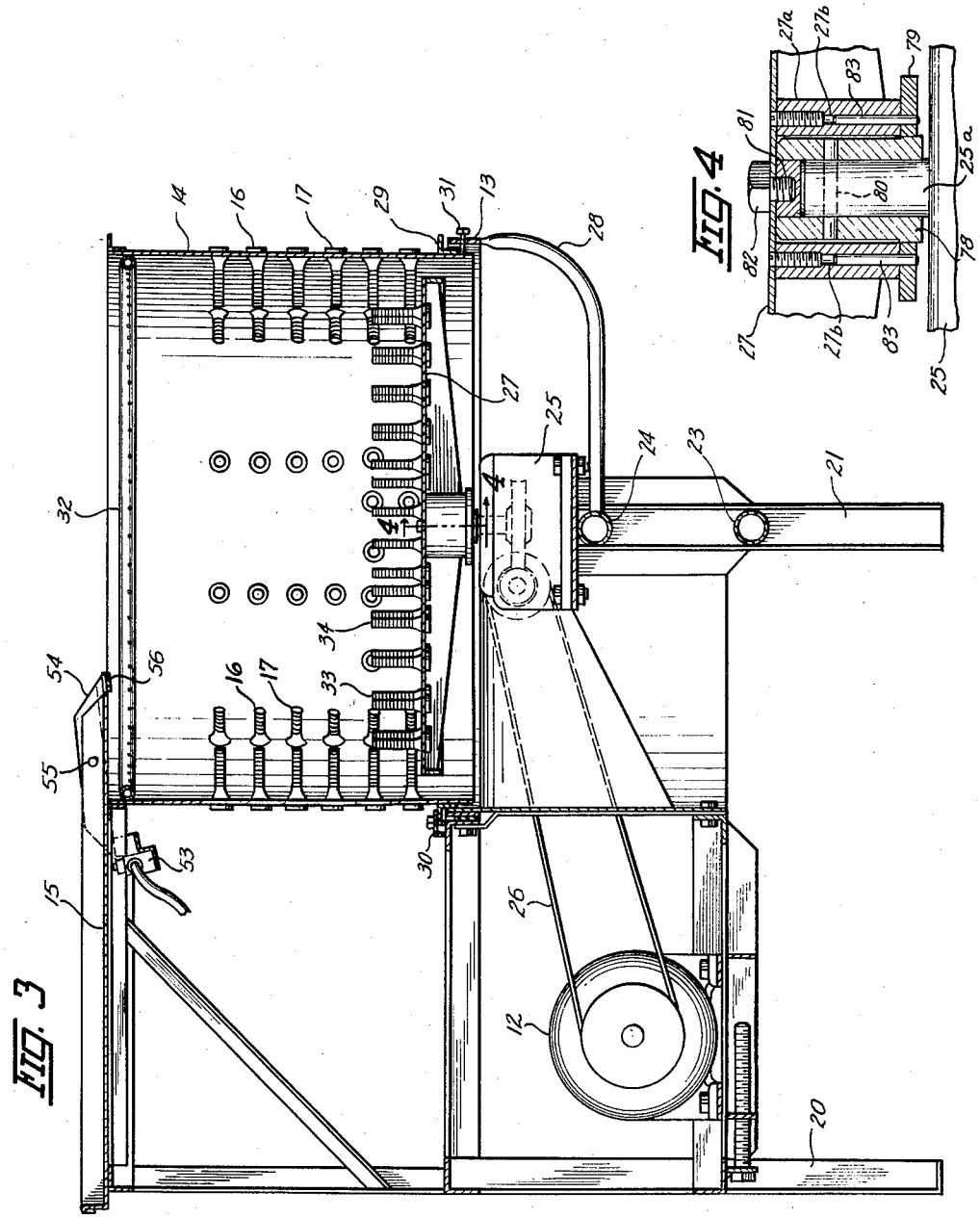

Dec. 2, 1958     F. COREY ET AL     2,862,230
POULTRY PROCESSING EQUIPMENT
Filed July 30, 1956     5 Sheets-Sheet 3
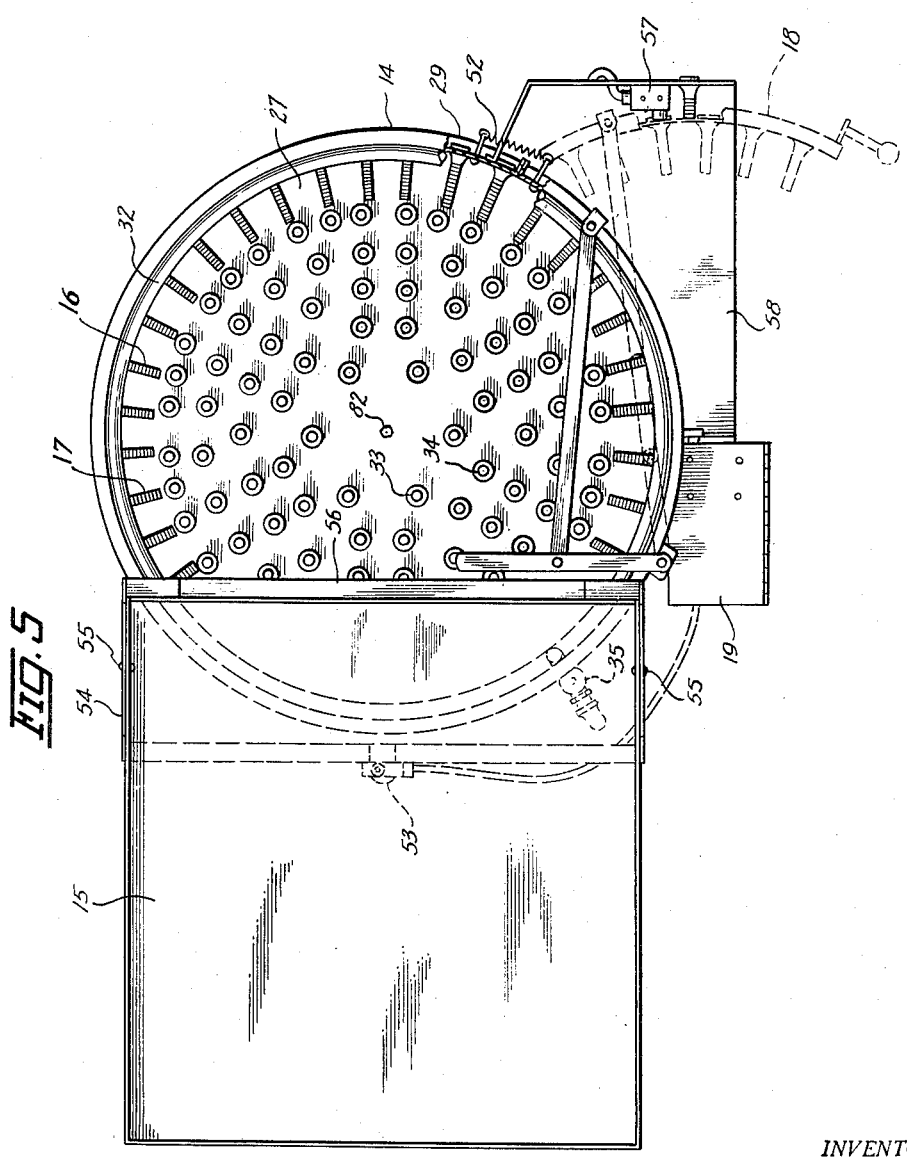
INVENTORS.
FLOURNOY COREY
ROBERT D. PITTS
BY *Flournoy Corey*
ATTORNEY.

Dec. 2, 1958  F. COREY ET AL  2,862,230
POULTRY PROCESSING EQUIPMENT
Filed July 30, 1956  5 Sheets-Sheet 4
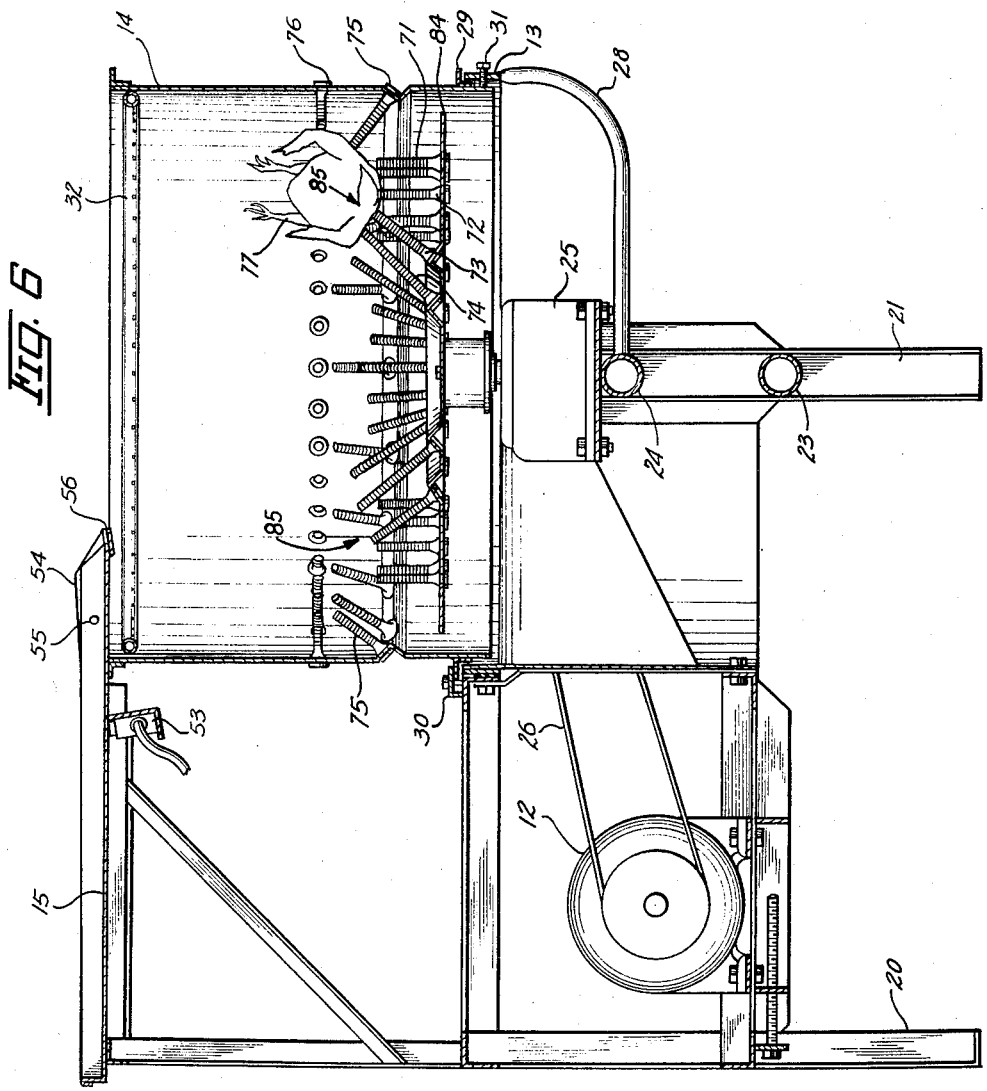
INVENTORS.
FLOURNOY COREY
ROBERT D. PITTS
BY *Flournoy Corey*
ATTORNEY.

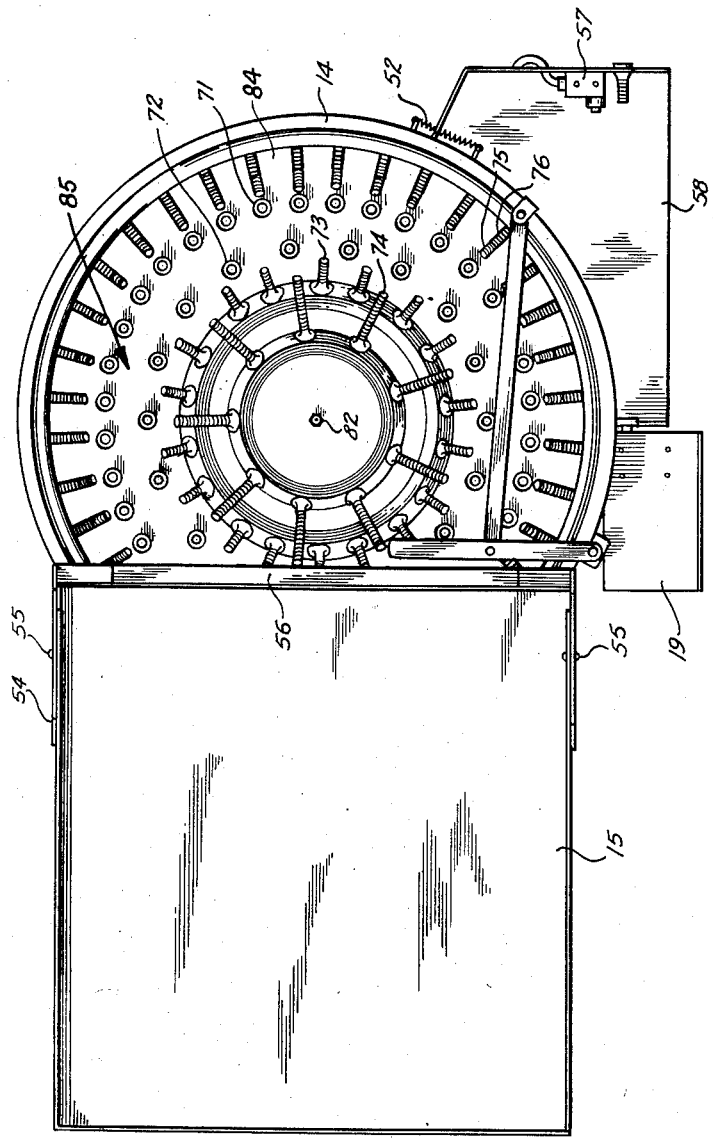

United States Patent Office 2,862,230
Patented Dec. 2, 1958

2,862,230

POULTRY PROCESSING EQUIPMENT

Flournoy Corey and Robert Donald Pitts, Cedar Rapids, Iowa, assignors to Pickwick Company, Cedar Rapids, Iowa, a corporation of Iowa Application July 30, 1956, Serial No. 601,081

4 Claims. (Cl. 17—11.1)

This invention is concerned with a poultry picker and more particularly a device adapted to pick loose fowl.

In picking fowl of all types in a single machine, it has been found that a wide range of adjustments and possible variations in times, temperatures and defeathering mechanisms must be provided. For example, chickens and turkeys may be picked at either 126 or 140 degrees, whereas ducks because of their oily nature may be picked at scalds higher than 140 degrees.

In experimentation it has been found that in higher temperature scalds, it is best to pick the bird with the application of water during the picking cycle. However in ducks, the down can be completely removed only by what is commercially known as the wax process—that is, dipping the bird in hot wax and then peeling the wax after it has been cooled. It will be apparent that the bird must be comparatively dry when this wax is applied. Therefore, it is desirable to stop the application of water before the picking cycle ends.

Also different types of fowl require different defeathering mechanisms. In fowl that have been scalded at a low temperature, care must be taken to provide a defeathering mechanism which will not bark the bird or in any other manner damage the skin surface.

In addition to the various critical requirements in the dressing process for various types of fowl, the picker must also be adapted to fit into varying arrangements of equipment in individual plants.

Our invention is directed to a combination of features in a single machine which will enable it to dress a wide variety of fowl, both domestic and wild, under a variety of circumstances.

A primary object of the invention is the provision of a poultry defeathering device which may be readily adjusted to conform to the needs of various processing plants.

Another object of the invention is the provision of improved flexible control means for devices of this nature.

Still another object of the invention is the provision, in such a device, of an arrangement of defeathering elements such that defeathering forces are applied over a large portion of the surface of an individual bird with relatively equal force.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims without departing from the spirit of the invention.

In said drawings:

Figure 3 is a side view in cross section taken along line 3—3 of the device shown in Figure 1.

Figure 4 is an enlarged cross sectional view of the disc mounting spindle taken at 4—4 of Figure 3.

Figure 5 is a top view of the machine shown in Figure 1 in which the position of the door, when open, is shown in dotted lines.

Figure 6 is another view in cross section showing a different arrangement of the feather removing mechanism, and Figure 7 is a top view of the device shown in Figure 6.

Figure 1:
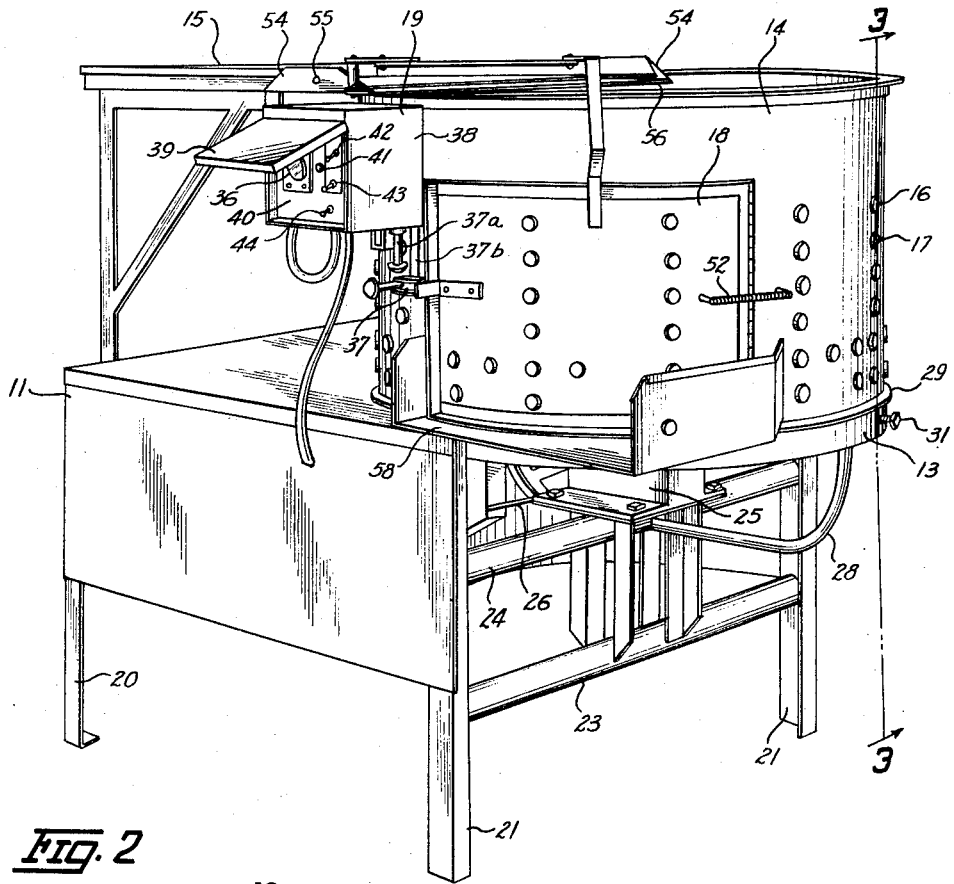
Figure 1 is a view in perspecive of a machine constructed according to our invention.

Referring now to Figure 1; a machine constructed according to our invention contains a main frame portion 11 which houses the motor and drive mechanism 12. This frame includes the circular mounting ring 13 which carries the detachable casing 14. A shelf 15 is mounted at one side of the circular casing and supported by the frame 11.

The casing carries a plurality of feather removing devices such as 16 and 17 and includes a hinged door 18, and a control box assembly 19 serves to permit this door to open at the end of a timed picking cycle.

Referring now to Figures 1 and 3, we will describe the structure in detail. The framework consists of four upright leg portions 20—20, and 21—21. Mounted horizontally between the two front legs 21—21 are two cross bars or pipes 23 and 24. Mounted upon the upper pipe is a gear reducer 25 which is connected to the motor 12 by a belt 26. This reducer of course serves to cause the disc 27 to revolve at considerably slower speed than the electric motor 12. The circular ring 13 is welded in position on the frame 11 and supported at its outer end by a rod 28. The cylindrical casing 14 is positioned in the ring 13 in such manner that it can be turned through a full 360 degree arc. To accomplish this, the lower portion of the casing is provided with an angle 29, the horizontal leg being long enough to extend over the ring 13. Clamps 30 and 31 are used to hold the casing firmly in position in the ring when the desired positioning is obtained.

The disc 27 is demountably secured to the output shaft 25a of the speed gear reducer in a manner best shown in Figure 4. A driving spool 78 carrying a driving flange 79 is affixed to the output shaft 25a by means of the taper pin 80. The upper end of the driving spool is provided with a threaded portion 81 to receive a cap screw 82 which is adapted to secure the disc 27 after it is positioned on the spool.

The hub 27a of the disc is bored for reception over the spool, holes being provided in the hub as at 27b—27b parallel to the axis of the hub to receive the drive pins 83—83 which are of a length to project below the hub. Loosely fitted mating holes are provided in the driving flange 79. Thus the disc may be easily removed for cleaning or servicing by simply lifting after the cap screw 82 is removed.

The upper portion of the casing carries a circular water line 32 which is positioned to spray water against the interior of the casing and into the picking area. The disc 27 is provided with a plurality of picking mechanisms, such as 33 and 34. The supply of water to the ring is controlled by an electrically operated solenoid valve 35.

The solenoid water valve 35 is operatively connected to the control box. In operation, the disc 27 is in constant rotation at all times. Fowl are introduced into the machine at the open top of the casing, the birds being placed on the shelf 15 until a sufficient number have been collected to load the casing. At this time the fowl are pushed into the casing and the door 18 closed. This serves to start the timer mechanism 36 which, at the same time, opens the solenoid water valve 35 and thus provides the water valve operating means. The door remains closed for a predetermined length of time during which the poultry are being picked. At the end of that timed period, the latch 37 is released and the door opens. Centrifugal force throws the birds out this open door.

It will be apparent that this timed cycle will be varied for different types of fowl and also apparent that means must be provided to cause the water to be flushed into the machine, either for the entire cycle or only a portion thereof. The circuit for accomplishing these desired results is shown in some detail in Figure 2 and we will now describe that means.

Figure 2:
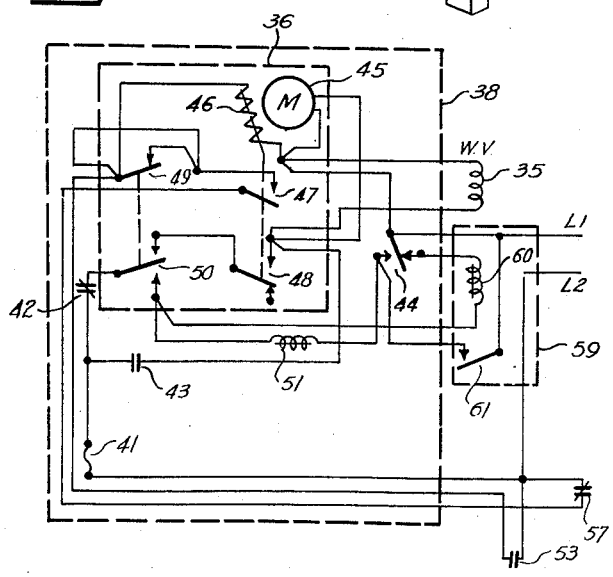
Figure 2 is a schematic diagram of the circuit which permits the operation of the water line and the opening of the door.

Referring now to Figures 1 and 2, the main control box 19 comprises in general, an enclosure 38 with hinged cover 39 and an instrument panel 40 mounted upon which are a timer 36, a fuse 41, and manual control switches 42, 43 and 44. The timer 36 is of a commercially available type having a timing motor 45, a solenoid-operated clutch 46, a single pole, single throw switch 47, and single pole double throw switch 48, the two being mechanically connected to operate simultaneously with the clutch when the clutch is energized.

A second group of switch contacts includes a single pole single throw switch 49, and a single pole double throw switch 50 mechanically interlocked to function at the end of a timing cycle as determined by the timing motor.

The weighted latch 37 is mounted for free movement vertically and is arranged to secure the door upon the doors being closed. A manual release 37a permits the door to be opened manually at any time. An electric solenoid 51, Figure 2, secured to the top of the latch bar 37b is adapted to lift the latch bar at the end of a timing cycle to release the door which is then caused to open by means of the door spring 52 (Figure 1). The solenoid of the water valve 35 is connected to the timer so as to normally operate during the timing cycle. However, a manual control switch 43, on the control panel, permits continuous operation of this valve when desired.

Operation of a picking cycle is initiated by a starting switch 53 mounted on the underside of the loading shelf 15. This switch is adapted to be closed by a lever arm in the form of a cradle 54 which is pivotally supported on the shelf 15 as indicated at 55. Pressure on the outermost portion 56 of the cradle 54 by a batch of birds as they are being pushed into the machine is sufficient to momentarily close the starting switch 53. The door is, of course, closed manually prior to loading the birds into the machine. At the end of the defeathering cycle, and when the door latch is lifted by the solenoid 51, the door is opened by the spring 52. At the same time, the door strikes a switch 57 secured to the side of the discharge chute 58. This normally-closed switch opens a holding circuit permitting the clutch to drop out and the timing mechanism to reset ready for a new cycle of operation.

Thus, the normal cycle of operation permits either continuous operation of the water supply or operation during the defeathering cycle only.

In the process of defeathering ducks, as described hereinbefore, excess water on the ducks when discharged from the picking mechanism interferes with ready adhesion of wax when the birds are dipped in the wax tank.

Various means, such as hot air currents, have been employed to remove this excess water prior to waxing. However, we have provided means for delaying ejection of birds from the picker after the water valve has closed, thus permitting the defeathering members 33, 34, 16 and 17 to wipe the excess water from the birds. This means is shown in the form of a pneumatic time delay switch 59, a double throw switch 44 being provided to selectively connect the solenoid 60 of the time delay switch or the latch solenoid 51 into the circuit.

When the time delay switch is in use, it causes closure of the switch 61, after a preset interval of several seconds, to connect the latch solenoid in parallel with the time delay solenoid. Thus the opening of the door is delayed sufficiently long to wipe excess water from the birds before they are discharged.

In the device shown in Figure 3, the picking mechanism comprises the revolving disc 27 with a plurality of upright fingers such as 33 and 34 over its entire surface. It will be understood that this disc operates in a horizontal plane and that the fowls are carried in a circular path by this revolving disc. Centrifugal force causes them to be thrown outwardly against another set of fingers, such as 69 and 70, which are mounted in the wall casing 14. In Figure 3 these fingers all extend inwardly from the casing in a horizontal direction.

Figure 6 discloses a different form of picking mechanism. In this instance, the disc 84 carries a plurality of fingers but only the outer fingers 71 and 72 are vertical. The third row inwardly carries a finger which extends at an outward angle in relation to the outer two rows. This finger, such as 73, is somewhat longer than fingers 71 and 72. The fourth row of fingers towards the center of the disc are positioned at even a greater outward angle in relation to the vertical than the third row. This finger position is indicated generally at 74, and in this row the fingers are considerably longer than those in the third row. The angles of fingers 73 and 74 are such that their outer ends are much closer to the outside of the casing than the mounting base.

The casing also has a different arrangement of fingers than is shown in Figure 3. In this instance, the bottom row of fingers, indicated at 75, are positioned at an angular relation to the casing wall and extend upwardly into the interior of the casing. The second row of fingers, such as 76, are horizontal and extend inwardly toward the center of the casing.

It will be apparent that the arrangement of fingers in Figure 6 is such as to make a circular cradle 85 for the fowl 77. In this way the fowl is caught between two rows of stationary fingers, such as 75 and 76, and four rows of revolving fingers. This sets up an opposite force which causes the bird to turn and, in so doing, be picked by all of the fingers involved through an arc of approximately 160 degrees. Of course, it will be apparent that the weight of the bird is supported by all of the fingers involved, and that no great force will be applied to the bird at any one time by any single finger, which reduces the possibility of damage to the skin of the fowl.

It will be apparent from the foregoing that by various manual adjustments, varieties of fowl can be picked, each having their own particular requirements for satisfactory defeathering. The casing may be turned in a 360 degree arc in order that the birds may be discharged in any direction required or, if necessary, the casing may be removed entirely to permit poultry to be picked on the disc directly. Of course, in such an operation the birds must be held by the operator to prevent them to be thrown away from the revolving disc.

Although we have described specific embodiments of our invention, it is apparent that modifications thereof may be made by those skilled in the art. Such modifications may be made without departing from the spirit and scope of our invention as set forth in the appended claims.

We claim as our invention:

1. In a device of the type described, a frame, a substantially cylindrical enclosure mounted thereon, a rotatable picking element mounted on said frame and disposed within said enclosure, means supported by said frame at the top of said casing for spraying water over the interior of the enclosure, and control means supported by said frame for timing the length of the picking cycle of poultry placed within the enclosure, said control means including valve operating means for turning on the water at the start of the picking cycle and valve operating means for turning off the water a selected length of time before the end of the picking cycle, whereby poultry being picked will be wiped substantially free of excess water before the poultry is discharged from the picker.

2. In a poultry processing device, a frame, a separate cylindrical casing mounted on said frame, and a rotatable circular platform mounted for rotation in said frame adjacent the lower portion of said casing, said casing containing a plurality of inwardly-extending elongated defeathering means, said rotatable circular platform having a peripheral flat marginal surface and at least one annular inclined surface extending upwardly and away from said flat marginal surface, elongated defeathering means mounted in spaced rows on said flat marginal surface and said upwardly extending inclined surfaces, said elongated defeathering means being graduated to greater lengths in successive rows inwardly, said defeathering means of greatest length being mounted on said upwardly extending inclined surfaces whereby said elongated defeathering means in said rotatable disc will cooperate with said inwardly extending defeathering means in said casing to create a circular cradle adapted to hold a fowl and remove the feathers therefrom.

3. In a poultry processing device, a frame, a separate cylindrical casing mounted on said frame, and a rotatable circular platform mounted for rotation in said frame adjacent the lower portion of said casing, said casing containing a plurality of inwardly-extending elongated defeathering means, said rotatable circular platform having a peripheral flat marginal surface and a plurality of spaced annular inclined surfaces, each extending upwardly and away from said flat marginal surface, elongated defeathering means mounted in spaced rows on said flat marginal surface and on said upwardly extending inclined surfaces, said elongated defeathering means being graduated to greater lengths in successive rows inwardly, said defeathering means of greatest length being mounted on said upwardly extending inclined surfaces whereby said elongated defeathering means in said rotatable circular platform will cooperate with said inwardly extending defeathering means in said casing to create a circular cradle adapted to hold a fowl and remove the feathers therefrom, the disc-mounted elongated defeathering means being angularly disposed outwardly.

4. In a poultry defeathering apparatus of the type including a frame, a vertically disposed casing supported by said frame and having a circular cross-section, an opening in the side wall thereof and a closure for said opening, a plurality of resilient poultry retarding members mounted on the inner surface of said casing and extending inwardly therefrom and a circular platform rotatably mounted on said frame adjacent the lower end of said casing and having a plurality of resilient defeathering members mounted therein and extending toward the interior of said casing; the improvement which comprises a circular supporting ring mounted on said frame, an outwardly extending flange member secured to the exterior surface of said casing adjacent the lower end thereof, said flange member being disposed to overlie said circular supporting ring when the lower end of said casing is disposed within said supporting ring, said casing being thus detachably and rotatably supported by said circular supporting ring, and clamping means connecting said frame and said casing for securing said casing and the opening therein in a predetermined position.

References Cited in the file of this patent

UNITED STATES PATENTS

| 686,576 | Blache | Nov. 12, 1901 |
| 745,658 | Perry et al. | Dec. 1, 1903 |
| 2,484,236 | Mead | Oct. 11, 1949 |
| 2,777,158 | Pitts et al. | Jan. 15, 1957 |

FOREIGN PATENTS

| 10,325 | Great Britain | 1886 |